Aug. 28, 1956 E. R. WADE 2,760,387
DRILL PRESS HAVING COOLANT RECIRCULATING MEANS
Filed Aug. 10, 1953

INVENTOR.
Earl R. Wade
BY
ATTORNEY.

United States Patent Office 2,760,387
Patented Aug. 28, 1956

2,760,387

DRILL PRESS HAVING COOLANT RECIRCULATING MEANS

Earl R. Wade, Independence, Mo.

Application August 10, 1953, Serial No. 373,096

1 Claim. (Cl. 77—55)

This invention has to do with improvements in machine tools and more particularly to a combined machine tool and coolant recirculating means, the primary object being to include in a unitary assembly structure operated by the prime mover of the machine tool for continuously directing a coolant to the tool thereof.

It is the most important object of the present invention to provide a coolant recirculating system for machine tools requiring no alteration of the machine tool itself, yet adapting the latter for automatic operation of the recirculating system without the necessity of providing expensive and cumbersome operating structure.

Another object hereof is to provide a machine tool wherein the coolant is contained within an open top pan underlying the tool head and into which pan the base of the machine tool, as well as a circulating pump, are mounted, the tubular standard of the machine tool being utilized for providing a driving connection between the prime mover of the machine tool and such pump.

Figure 1:
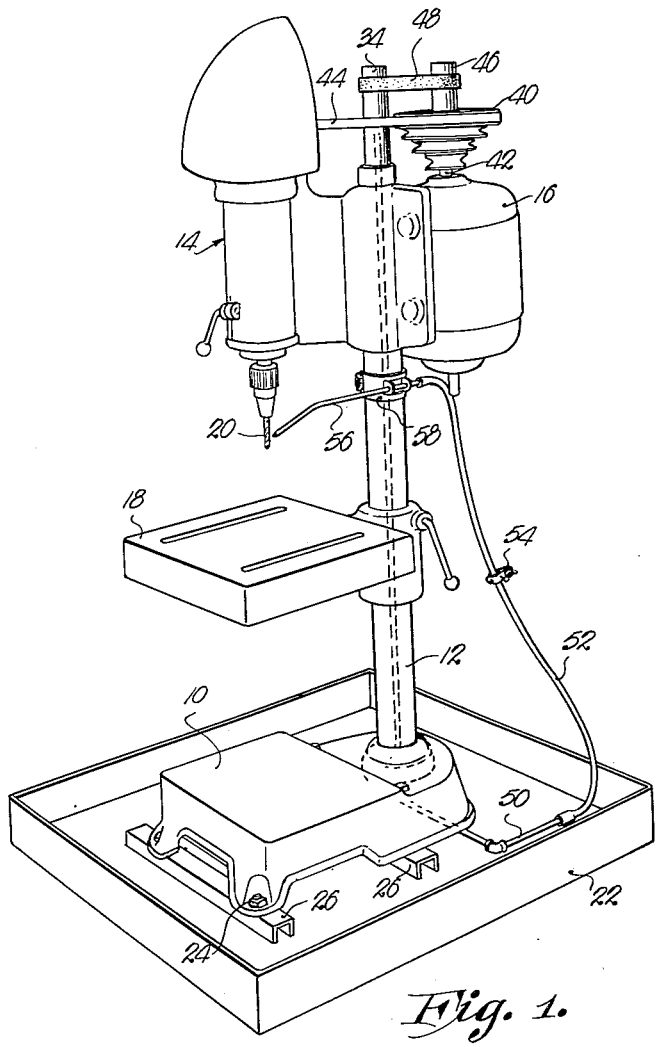
Figure 1 is a perspective view of a drill press having coolant recirculating means made pursuant to the present invention.

The drill press illustrated in Fig. 1 of the drawing, consists of a base 10, a tubular standard 12 rigidly secured to base 10, a tool head 14 and a prime mover 16. The standard 12 supports the tool head 14 and the prime mover 16, as well as a work table 18 underlying drill 20.

In accordance with the present invention a relatively shallow, open top pan 22 is provided for liquid coolant and within which is disposed the base 10 of the drill press. It is to be preferred that pan 22 and base 10 be interconnected by fasteners 24 and that the base 10 be held above the bottom of pan 22 by spacers 26.

Figure 2:
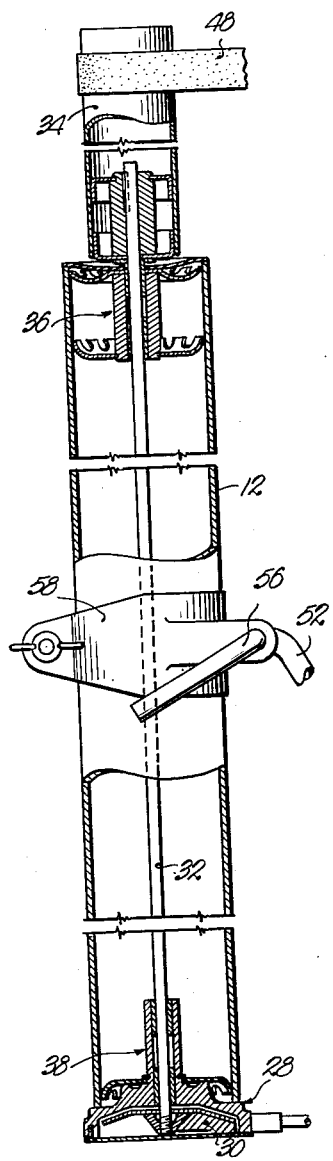
Fig. 2 is an enlarged, vertical, sectional view through the tubular standard of the drill press and showing the improvements hereof operably associated therewith.
Figure 3:
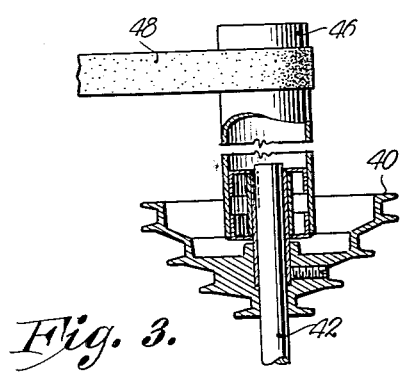
Fig. 3 is a detailed view illustrating the manner of adapting the drive shaft of the prime mover to use for driving the circulating pump.

Standard 12 is best shown in Fig. 2 of the drawing and has a liquid pump 28 on the lowermost end thereof within hollow base 10 and within the coolant of pan 22. Impeller 30 of pump 28 is secured directly to the lowermost end of a vertical shaft 32 within standard 12 and which shaft 32 projects above the upper end of standard 12 for receiving a tube 34 that is secured thereto in any suitable manner. Bearing assemblies 36 and 38 support the shaft 32 within the standard 12.

Differential pulley 40 on vertical drive shaft 42, is operably connected with the tool head 14 by a continuous belt 44 and a tube 46 secured rigidly to the shaft 42 above pulley 40 receives a continuous belt 48 that is also trained around the tube 34.

Means for directing the coolant from the pan 22 to the drill 20 includes a conduit that is made up of pipe 50 communicating with the pump 28, a hose 52 having flow-control means 54 mounted thereon and a short pipe 56 mounted on the standard 12 by a bracket 58.

It is obvious that during operation of the drill press, coolant is directed from the pan 22 to the drill 20 continuously by virtue of the fact that the prime mover 16 drives the tube 46 and thereby the tube 34 through the belt 48. This rotates shaft 32 and the impeller 30, the latter of which forces the coolant from the pan 22 to pipe 30, hose 52 and pipe 56. Inasmuch as the drill 20 is disposed directly above the open top of pan 22 such coolant will gravitate back into the pan 22 and a recirculating system is thereby presented.

It is now seen that the recirculating means hereof may be adapted for use with power tools of this type and for operation thereby through connection with its prime mover without altering the drill press itself and by making advantageous use of the tubular standard 12 forming a part of the machine tool.

Having thus described the invention what is described as new and desired to be secured by Letters Patent is:

For use in combination with a drill press including a base having an open-bottomed internal chamber, an elongated, upright, open-ended, tubular standard supported by the base and communicating at its lower end with a chamber of the base, a tool head supported by the standard, a tool carried by the tool head and a prime mover supported by the standard and operably coupled with the tool head, means for supplying cooling liquid to said tool comprising an open-topped pan having a bottom and sides, said pan being adapted to receive a supply of said liquid and disposed with its bottom below said base and its sides extending upwardly around said base; a liquid pump within the chamber of the base on the lower end of the standard; an elongated, vertical shaft rotatably mounted within the standard and extending through the latter, the lower end of the shaft being operably coupled with the pump; means operably coupling the upper end of the shaft with the prime mover; and a conduit joined with the pump, supported by the standard and having an open end disposed to direct liquid upon said tool.

References Cited in the file of this patent

UNITED STATES PATENTS 1,099,425    Carper _____ June 9, 1914
1,652,877    Rose et al. _____ Dec. 13, 1927